(12) United States Patent
Blum et al.

(10) Patent No.: US 11,008,023 B2
(45) Date of Patent: May 18, 2021

(54) LIFTABLE CARRYING APPARATUS

(71) Applicants: Kaessbohrer Transport Technik GmbH, Eugendorf (AT); Franz Blum, Salzburg (AT)

(72) Inventors: Franz Blum, Salzburg (AT); Horst Foessl, Elsbethen (AT)

(73) Assignee: KAESSBOHRER TRANSPORT TECHNIK GMBH, Eugendorf (AT)

( * ) Notice: Subject to any disclaimer, the term of this patent is extended or adjusted under 35 U.S.C. 154(b) by 0 days.

(21) Appl. No.: 16/530,105

(22) Filed: Aug. 2, 2019

(65) Prior Publication Data
US 2020/0039735 A1    Feb. 6, 2020

(30) Foreign Application Priority Data

Aug. 3, 2018    (EP) ..................................... 18187294

(51) Int. Cl.
*B61D 3/18*    (2006.01)
*B60P 3/08*    (2006.01)
(Continued)

(52) U.S. Cl.
CPC ............... *B61D 3/18* (2013.01); *B60P 3/08* (2013.01); *B61D 3/04* (2013.01); *B65G 63/004* (2013.01);
(Continued)

(58) Field of Classification Search
CPC .... B60P 3/08; B61D 3/04; B61D 3/18; B61D 3/182; B61D 3/184; B61D 47/005; B65D 2585/6867; B65G 63/004
See application file for complete search history.

(56) References Cited

U.S. PATENT DOCUMENTS 3,646,609 A * 2/1972 Bodenheimer ...... B65D 88/022
220/1.5
4,124,119 A * 11/1978 Nordstrom ................ B60P 3/08
206/335

(Continued)

FOREIGN PATENT DOCUMENTS

CN    2406886    11/2000
EP    0 297 081    12/1988
(Continued)

OTHER PUBLICATIONS

Search Report dated Jan. 23, 2019 in European Application No. 18 18 7294 with English translation.

*Primary Examiner* — James Keenan
(74) *Attorney, Agent, or Firm* — Wenderoth, Lind & Ponack, L.L.P.

(57) ABSTRACT

A liftable carrying apparatus for loading a pocket wagon with vehicles by a lifting apparatus includes a first support portion for at least one vehicle that extends over a length, at least one second support portion for at least one vehicle, that is arranged above the first support portion and extends over a length, and receiving locations, in particular receiving pockets, for a lifting apparatus, that are arranged at the first and the at least one second support portions. The length over which the first support portion extends and the length over which the at least one second support portion extends differ from each other, and the first and the at least one second support portions are or can be releasably connected together for joint lifting by a lifting apparatus.

19 Claims, 16 Drawing Sheets

(51) Int. Cl.
 B65G 63/00 (2006.01)
 B61D 3/04 (2006.01)
 B65D 85/68 (2006.01)
 B65D 90/00 (2006.01)
 B65D 88/12 (2006.01)
(52) U.S. Cl.
 CPC .............. *B65D 85/68* (2013.01); *B65D 88/12* (2013.01); *B65D 90/0006* (2013.01); *B65D 2585/6867* (2013.01)

(56) References Cited

U.S. PATENT DOCUMENTS

| | | | | |
|---|---|---|---|---|
| 4,917,557 A * | 4/1990 | Kato | ......................... | B60P 3/08 414/229 |
| 4,986,705 A | 1/1991 | Durkin | | |
| 5,213,458 A | 5/1993 | Preller et al. | | |
| 5,255,806 A * | 10/1993 | Korzeniowski | ...... | B65D 88/121 206/599 |
| 5,344,266 A * | 9/1994 | Kolb | ......................... | B60P 3/08 410/145 |
| 5,863,173 A * | 1/1999 | Bremner | ................... | B60P 3/08 280/414.1 |
| 5,890,855 A * | 4/1999 | Claps | ........................ | B60P 3/08 410/24 |
| 6,655,300 B1 * | 12/2003 | Clive-Smith | ............. | B60P 3/08 108/53.5 |
| 9,108,786 B2 * | 8/2015 | Kohlgruber | ............... | B60P 3/08 |
| 10,583,847 B2 * | 3/2020 | Blum | ....................... | B61D 3/08 |
| 10,632,894 B2 * | 4/2020 | Andre | ....................... | B60P 3/06 |
| 2018/0009451 A1 | 1/2018 | Blum et al. | | |
| 2020/0039538 A1 * | 2/2020 | Blum | ..................... | B61D 3/184 |

FOREIGN PATENT DOCUMENTS

| | | | | |
|---|---|---|---|---|
| FR | 2148069 | | 3/1973 | |
| FR | 2650547 A1 * | | 2/1991 | ............... B61D 3/18 |
| WO | WO-8101997 A1 * | | 7/1981 | ........... B65D 88/129 |
| WO | WO-9210415 A1 * | | 6/1992 | ............... B60P 3/08 |
| WO | 01/72593 | | 10/2001 | |
| WO | 2014/017917 | | 1/2014 | |
| WO | 2016/141399 | | 9/2016 | |

* cited by examiner

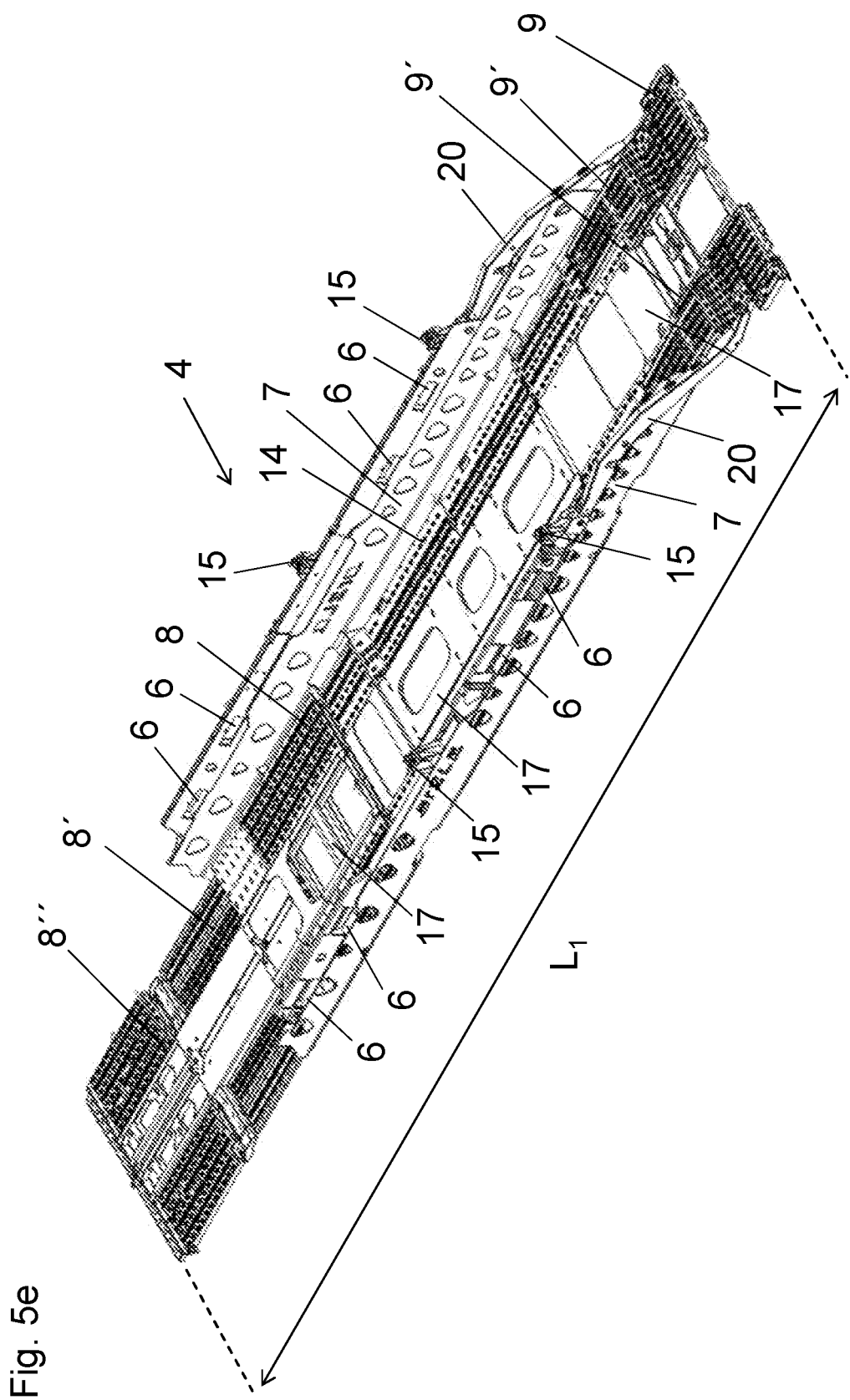

LIFTABLE CARRYING APPARATUS

BACKGROUND OF THE INVENTION

The invention concerns a liftable carrying apparatus, a pocket wagon having such a carrying apparatus, and a method of loading or unloading a pocket wagon.

Cargo which itself does not have to be directly cranable can be loaded in many different forms with such a carrying apparatus as the carrying apparatus itself is cranable. The cargo can be for example vehicles (for example semitrailers, traction units, tractors, buses) or non-drivable cargo (for example containers).

WO 2014/017917 A2 discloses a liftable carrying apparatus which is not of the general kind set forth and which is not suitable for use in combination with a pocket wagon as a pocket wagon loaded with such a carrying apparatus, in the loaded state, would be of an inadmissibly great height. The loading and unloading operation is only possible with difficulty because vehicles which are already loaded impede loading and unloading.

A liftable carrying apparatus of the general kind set forth, a pocket wagon having such a carrying apparatus and a method of the general kind set forth are disclosed in EP 297 081 A2. The specification discloses a modular carrying apparatus in the sense that there is provided a plurality of support means which can be loaded and unloaded independently of each other and which can be lifted on to or from a pocket wagon and in operation can be stacked one upon the other in the region of a pocket of the pocket wagon. A respective support means of higher structure is provided outside the pocket of the pocket wagon. A loading and unloading operation takes up a very long time because each support means in itself has to be lifted on to or from the pocket wagon.

The object of the invention is to provide a liftable carrying apparatus of the general kind set forth, a pocket wagon having such a carrying apparatus and a method of the general kind set forth, with which quicker loading and unloading is possible, wherein the loading and unloading operation is not to be made more difficult by vehicles which are already loaded.

SUMMARY OF THE INVENTION

The above object is attained by a liftable carrying apparatus as described below, a pocket wagon having such a carrying apparatus, and methods involving such a carrying apparatus.

Because the first and the at least one second support means are or can be releasably connected together for joint lifting by the lifting apparatus and form a carrying apparatus the carrying apparatus formed from the first and at least one second support means can be lifted as a unit on to and from a pocket wagon, wherein the first and at least one second support means can be loaded and unloaded separately, which speeds up and facilitates the loading and unloading operation. If there are more than one second support means, they form a unit with the first support means.

In a method according to the invention for loading a pocket wagon, preferably using a carrying apparatus according to the invention, at least the following steps are performed:

providing a first and at least one second support means on a terminal floor, wherein the first and the at least one second support means stand independently of each other on the terminal floor, loading the at least one second support means and optionally the first support means with the vehicles to be loaded, preferably by driving the vehicles on to the first and/or at least one second support means, placing the loaded at least one second support means on the first support means prior to lifting on to the pocket wagon to form a carrying apparatus liftable as a unit, in particular a carrying apparatus according to the invention, optionally loading the first support means—if same has not already been completely loaded—preferably by driving on the vehicle or the vehicles, and lifting the carrying apparatus by means of a lifting apparatus on to the pocket wagon in such a way that the at least one second support means is arranged above the first support means and the first support means projects at least partially into a pocket of the pocket wagon.

In a method according to the invention for unloading a pocket wagon, preferably using a carrying apparatus according to the invention, at least the following steps are performed:

lifting away the carrying apparatus as a unit by means of a lifting apparatus from the pocket wagon and setting it down on a terminal floor, optionally unloading the first support means by driving the vehicles off the first support means, lifting off the at least one second support means from the first support means and setting down the at least one second support means on a terminal floor, and unloading the at least one second support means and optionally the first support means, preferably by driving the vehicles off the first and at least one second support means.

The invention enjoys the advantage that a loading space which is made available by a pocket wagon can be put to optimum use because space available for loading over, under and between vehicles can be used for loading with further vehicles. In other words compacted (interleaved or nested) loading of the pocket wagon is possible.

If there is provided more than only one second support means then the length $L_2$ refers to the longitudinal extent of the overall arrangement of second support means.

In the present disclosure the term receiving position is used to denote that position of a support means, at which loading or unloading takes place. In the receiving position the support means can be oriented substantially horizontally or inclinedly and in that case, after loading with a vehicle, the vehicle is also correspondingly oriented horizontally. The term loading position is used to denote that position of a support means, in which the vehicle, after the conclusion of the loading operation, is disposed jointly with the support means on the pocket wagon. Depending on the respective configuration of the support means the vehicle in the loading position can be oriented horizontally or inclinedly.

If inclinable portions are provided in respect of the first or second support means then the respective length $L_1$, $L_2$ of the corresponding support means relates to the state in the receiving position.

For example the first support means can be of such a configuration as the carrying apparatus of WO 2016/141399 A1.

Preferably, in a carrying apparatus according to the invention, the first support means is arranged between two longitudinal bearers or in a carrying frame and/or the second support means is arranged between two longitudinal bearers or in a carrying frame. The first and/or the at least one second support means can be in the form of a plate, in the form of struts, in the form of longitudinal bearers or a combination of at least two of the aforementioned.

Preferably, in a carrying apparatus according to the invention, the first and the at least one second support means are adapted to be driven onto.

In that way the vehicles to be loaded can be driven onto or driven off the first and the at least one second support means when they are placed independently of each other on a terminal floor.

Preferably, in a carrying apparatus according to the invention, the first and the at least one second support means each have contact surfaces for direct placement on a terminal floor and the first and the at least one second support means can be driven onto independently of each other in the state of placement on the terminal floor.

It is preferably provided in a carrying apparatus according to the invention that the at least one second support means in its state of being connected to the first support means is carried by the first support means, wherein preferably there are provided coupling locations, by way of which the at least one second support means is or can be releasably connected to the first support means. If there are provided a plurality of second support means, for example two or three, second support means, they are or can be preferably respectively connected independently to the first support means. It is particularly preferably provided that the coupling locations are or can be connected by a twist lock, as are known from locking of swap containers or ISO containers.

The coupling locations of the second support means can also be used to connect together second support means which are stacked one upon the other.

It is preferably provided in a carrying apparatus according to the invention that at least one portion of the first and/or the at least one second support means is moveable between a receiving position for a vehicle, in which the vehicle is oriented substantially horizontally or inclinedly, and a loading position for the vehicle, in which the vehicle is inclined. The at least one inclinable portion can have an arresting device for arresting the inclined position. In that respect it is particularly preferably provided that the at least one inclinable portion is mounted pivotably freely—possibly except for an action of a damping device—to a carrying frame or longitudinal bearers of the first and at least one second support means respectively. Alternatively the pivotal movement can be effected by a lifting device which engages from the exterior or by lifting means disposed on the carrying apparatus (like for example hydraulic lifting means). Adjoining the at least one portion or—if there are provided at least two inclinable portions in the case of a support means—between the two inclinable portions of the first and/or at least one second support means, it is possible to arrange a further portion which can be driven onto, involving a fixed (preferably at least substantially horizontal) orientation.

It is preferably provided in a carrying apparatus according to the invention that at least one portion of the first and/or the at least one second support means is provided with a horizontal or inclined orientation, wherein it is preferably provided that an inclination of the at least one portion can be predetermined prior to a loading operation. The inclination can for example be predetermined in such a way that the at least one portion is mounted pivotably in relation to an axis and is supported by a support arrangement of predeterminable height. If the support arrangement is of a greater height the inclination of the at least one portion is less, while if it is of a lesser height the inclination is greater. Alternatively or additionally the inclination can be predetermined in such a way that the at least one portion is mounted pivotably in relation to an axis and the height of the axis can be selected. If the axis is of a greater height the inclination of the at least one portion is greater, if it is of a lesser height the inclination is less.

In general terms in a portion involving an inclination driving a vehicle on and/or driving it off can be facilitated by a drive-on ramp.

The provision of at least one portion which is moveable between a receiving position for a vehicle, in which the vehicle is oriented substantially horizontally or inclinedly, and a loading position for the vehicle, in which the vehicle is inclined, is preferably effected in relation to the first support means. The first support means is mounted directly on the pocket wagon and thus—in the situation where the pivotal movement is effected freely—the movement from the receiving position into the loading position can be effected by lowering the carrying apparatus on to the pocket wagon as soon as the first support means comes into contact with parts of the pocket wagon.

The provision of at least one portion which involves a horizontal or inclined orientation, wherein it is preferably provided that an inclination of the at least one portion can be predetermined prior to a loading operation, is preferably implemented in relation to the second support means.

Preferably, in a carrying apparatus according to the invention, a continuous internal width of at least about 2600 mm is given along the longitudinal extent of the first and at least one second support means transversely relative to the longitudinal extent.

Preferably, in a carrying apparatus having at least two inclinable portions, the one inclinable portion is arranged at the first support means by way of pivotably mounted arms which are preferably arranged outside the drivable width of the driveway on pivotal bearings. A length of the arms can be so selected that the other inclinable portion in a first pivotal position of the arms is prolonged by the inclinable portion in such a manner that it can be driven on. In a second pivotal position of the arms the inclinable portion is inclined relative to a carrying frame or longitudinal bearers of the support means.

Preferably, at least one inclinable portion is adapted to be variable in length. The variability in length can be effected by two interleaved telescopically extendable extension portions.

Preferably, a position of the carrying apparatus is secured in particular to prevent longitudinal displacements by way of a portion which projects beyond the pocket—preferably with an ISO stud of the pocket wagon, that is disposed outside the pocket.

In a first and fourth embodiment of a carrying apparatus according to the invention the length over which the at least one second support means extends is greater than the length over which the first support means extends.

In a first embodiment, the length of the at least one second support means is preferably selected so that the at least one second support means, in a state of being lifted onto a pocket wagon, projects beyond the pocket of the pocket wagon and the first support means is disposed in respect of its longitudinal extent within the pocket of the pocket wagon. The first and the at least one second support means involve a fixed (preferably at least substantially horizontal) orientation. The position of the first support means can be secured in particular to prevent longitudinal displacements by way of a portion which is connected to the first support means and which projects beyond the pocket—preferably with an ISO stud of the pocket wagon, that is disposed outside the pocket.

In alternative second and third embodiments of a carrying apparatus according to the invention, the length over which the first support means extends is greater than the length over which the at least one second support means extends.

In a second embodiment of the carrying apparatus according to the invention, the first support means has two inclinable portions which are moveable between a receiving position for a respective vehicle, in which the vehicle is oriented substantially horizontally or inclinedly, and a loading position for the vehicle, in which the vehicle is inclined. The inclinable portions are mounted pivotably freely—optionally except for an action of a damping device—to a frame or longitudinal bearers of the first support means, so that the pivotal movement is effected automatically by making contact with regions of the pocket wagon upon being lowered on to the pocket wagon. The pivotal movement can alternatively be effected by a lifting device which engages from the exterior or by lifting means arranged on the carrying apparatus (like for example hydraulic lifting means). A further drive-on portion of fixed (preferably at least substantially horizontal) orientation can be disposed between the two inclinable portions.

The at least one second support means extends in the longitudinal extent only over a part of the first support means and is therefore of shorter length than the first support means. The second support means can be in the form of a plate member of fixed (for example at least substantially horizontal) orientation and can be supported at the first support means by way of coupling locations (arranged at the first and second support means). At least one of the inclinable portions of the first support means can extend in the inclined state under the second support means. It can be provided that the inclinable portions of the first support means, in a state of being lifted on to a pocket wagon, extend beyond the pocket of the pocket wagon. It can be provided that the second support means in respect of its longitudinal extent is within the pocket of the pocket wagon. The pivot axes of the inclination of the inclinable portions can be disposed (at least in a plan view) for example within the pocket of the pocket wagon.

In a third embodiment of the carrying apparatus according to the invention, the first support means has two inclinable portions which are respectively moveable between a receiving position for a respective vehicle, in which the vehicle is oriented substantially horizontally or inclinedly, and a loading position for the vehicle, in which the vehicle is inclined. The inclinable portions are preferably mounted pivotably freely—optionally except for an action of a damping device—to a frame or longitudinal bearers of the first support means so that the pivotal movement is effected automatically by making contact with regions of the pocket wagon upon lowering onto the pocket wagon. Alternatively, the pivotal movement can be effected by a lifting device engaging from the exterior or by a lifting means arranged on the carrying apparatus (like for example hydraulic lifting means). The second support means has a portion of an inclination which is predetermined prior to loading. A further drivable portion of fixed (preferably at least substantially horizontal) orientation can be arranged between the two inclinable portions of the first support means.

The inclinable portions of the first support means, in a state of being lifted onto a pocket wagon, can extend beyond the pocket of the pocket wagon. The inclined portions of the second support means can be disposed in respect of their longitudinal extent within the pocket of the pocket wagon. The pivot axes of the inclination of the inclinable portions are disposed for example (at least in a plan view) within the pocket of the pocket wagon.

In a fourth embodiment of the carrying apparatus according to the invention the first support means is provided continuously with a fixed inclination (preferably at least substantially horizontal) and the second support means has three portions, the inclination of which can be predetermined prior to loading.

The portions of the first support means can be disposed in respect of their longitudinal extent within the pocket of the pocket wagon. The inclined portions of the second support means, in a state of being loaded onto a pocket wagon, can extend beyond the pocket of the pocket wagon.

BRIEF DESCRIPTION OF THE DRAWINGS

Embodiments by way of example of the invention are discussed with reference to the Figures in which:

FIG. 5e shows a first support means of an embodiment of a carrying apparatus according to the invention.

DETAILED DESCRIPTION OF THE INVENTION

Figure 1:
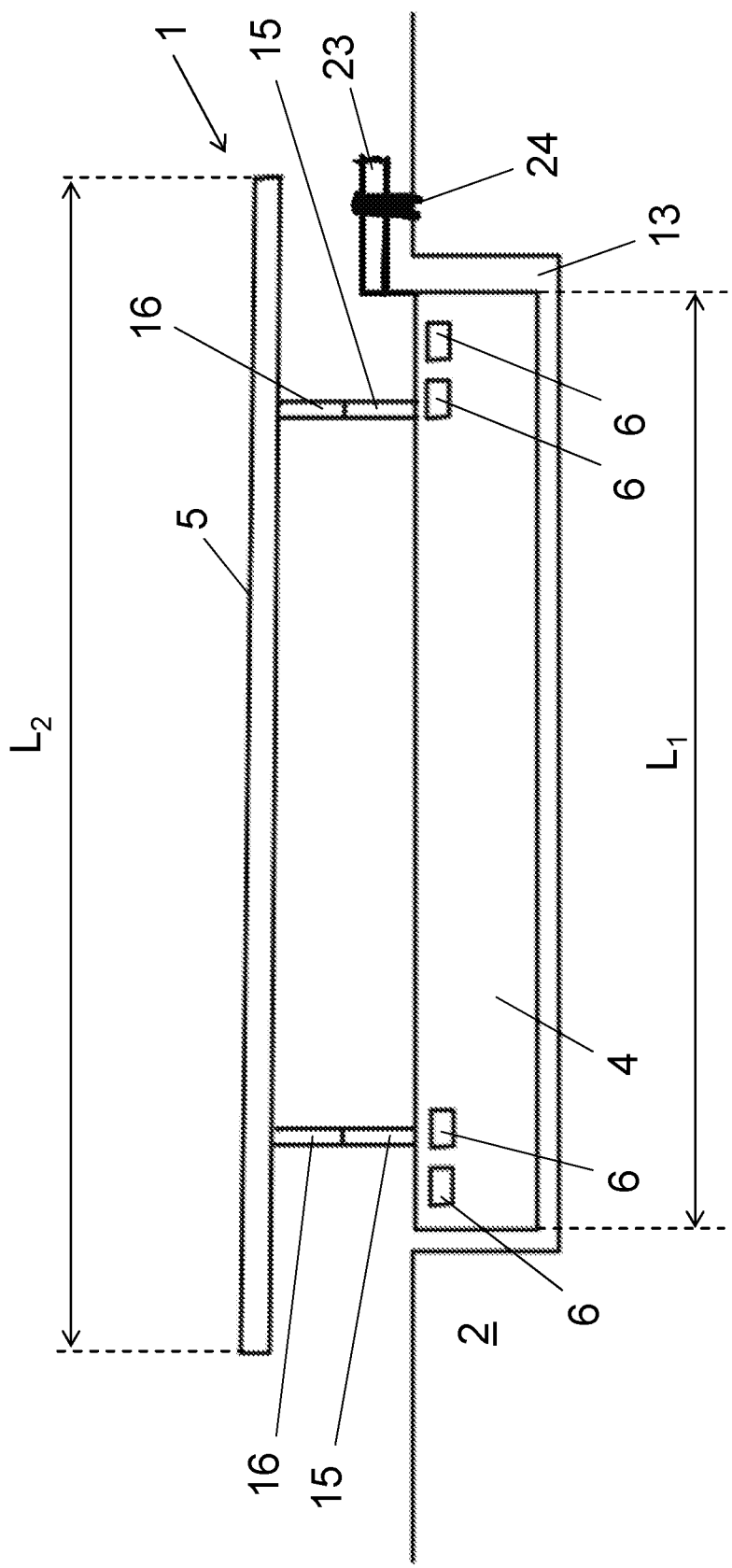
FIGS. 1-4 show four different embodiments by way of example of a carrying apparatus according to the invention as diagrammatic side views in the state of being arranged in a pocket wagon.

FIG. 1 shows a diagrammatic side view of a first embodiment of a carrying apparatus according to the invention, in which the length $L_2$, over which the second support means 5 extends, is greater than the length $L_1$ over which the first support means 4 extends. In that respect the length $L_2$ is so selected that the second support means 5 projects beyond the pocket 13 of the pocket wagon 2. The first and second support means 4, 5 are adapted to be driven onto. The second support means 5 is supported by way of coupling locations 15, 16 at the first support means 4. The first support means 4 is disposed in its longitudinal extent within the pocket 13 of the pocket wagon 2. The first and second support means 4, 5 involve a fixed orientation (here at least substantially horizontal). The position of the first support means 4 is secured in particular to prevent longitudinal displacements by way of a portion 23 which projects beyond the pocket 13, with an ISO stud 24 of the pocket wagon 2, that is arranged outside the pocket 13 (that measure is shown only for this embodiment but can be provided in all embodiments). In this embodiment the second support means 5 can be loaded with more vehicles 3 (or a longer vehicle) than the first support means 4. For example the first support means 4 can be loaded with two vehicles 3 and the second support means 5 can be loaded with three vehicles 3.

Figure 2:
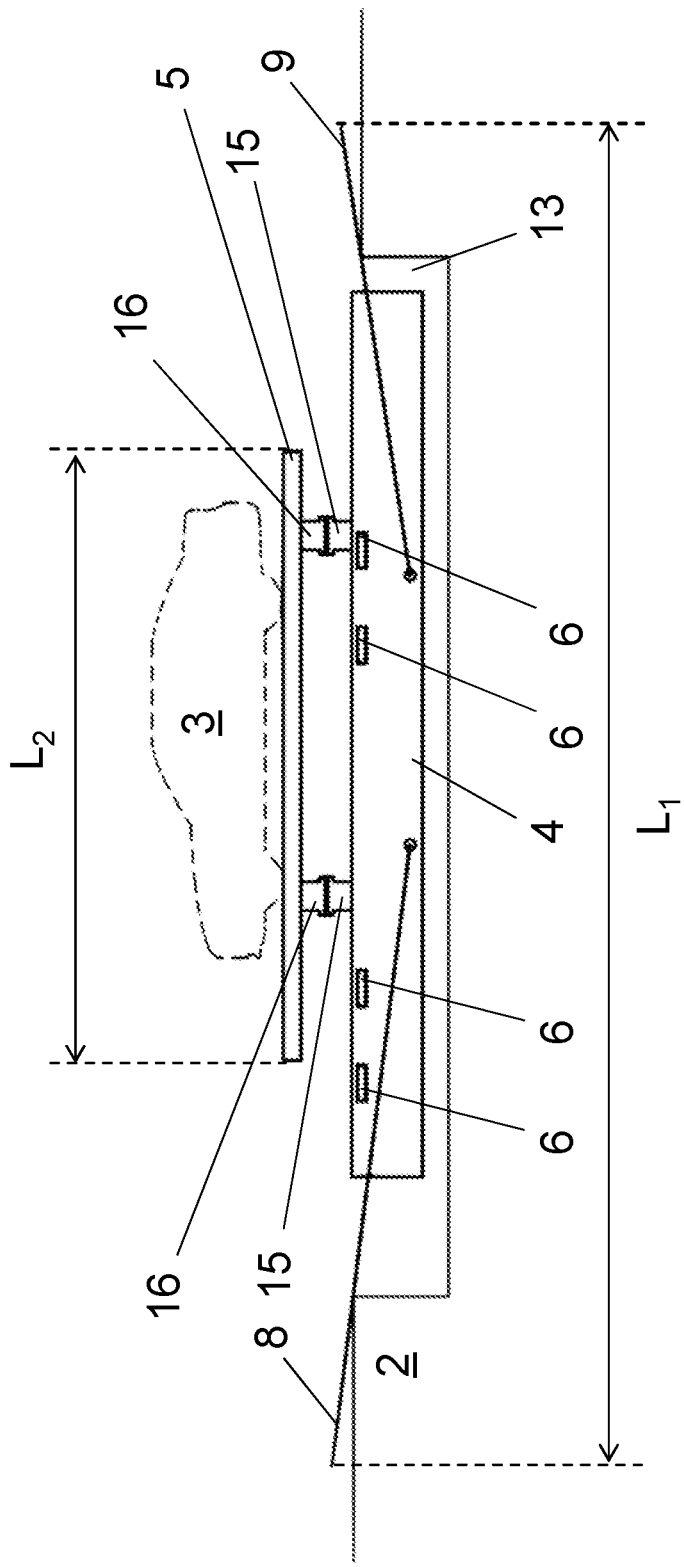
Figure 3:
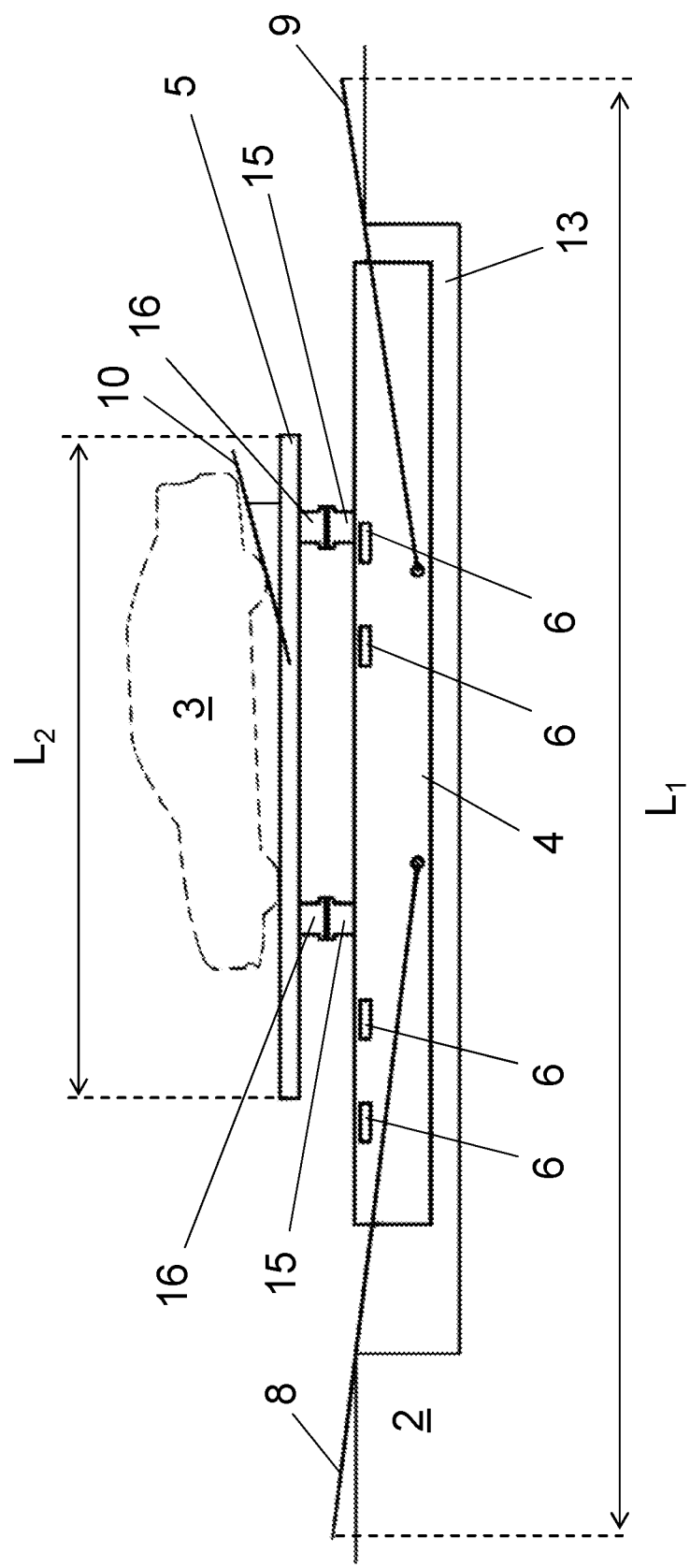

FIGS. 2 and 3 show diagrammatic side views of a second and third embodiment of a carrying apparatus 1 according to the invention, in which the length $L_1$ over which the first support means 4 extends, is greater than the length $L_2$ over which the second support means 5 extends.

Figure 5A:
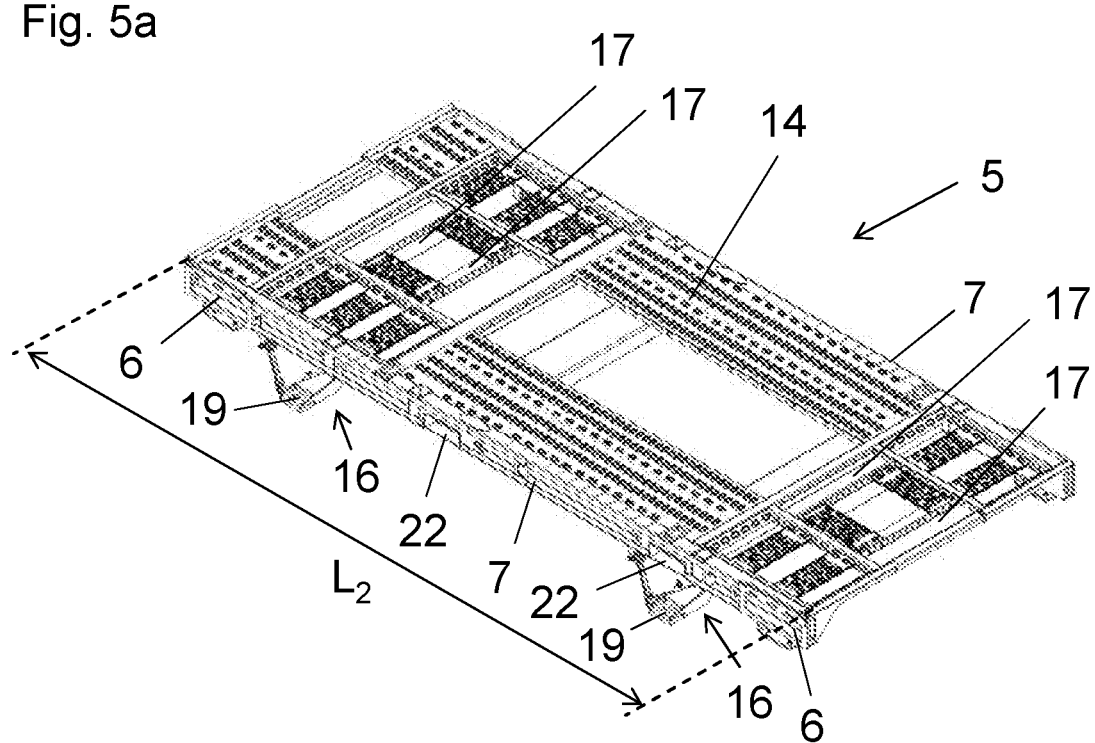
FIGS. 5a-d show two support means of an embodiment of a carrying apparatus according to the invention.
Figure 5B:
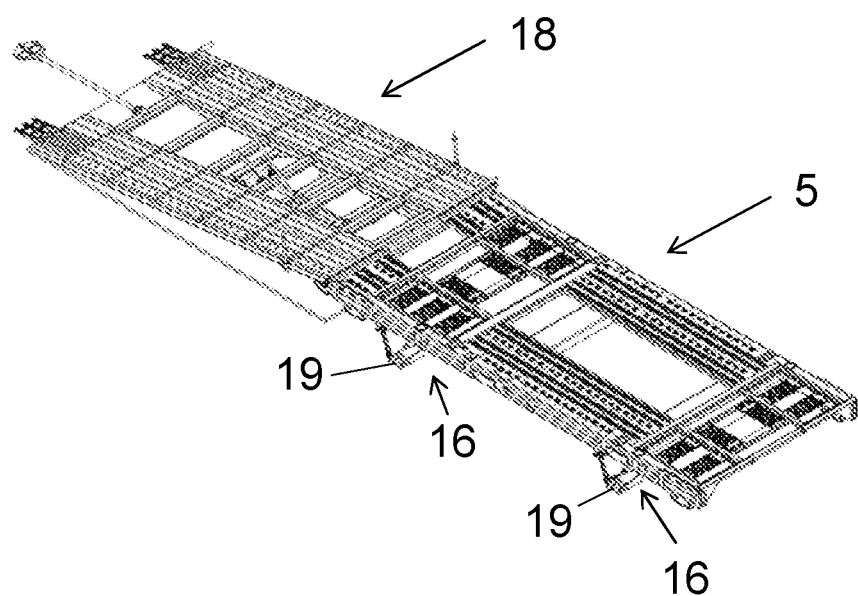
Figure 5C:
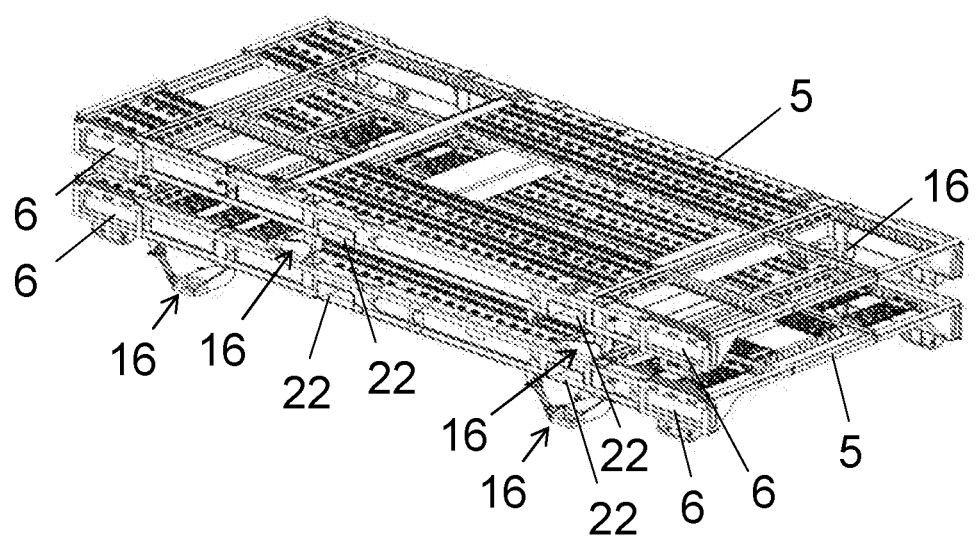
Figure 5D:
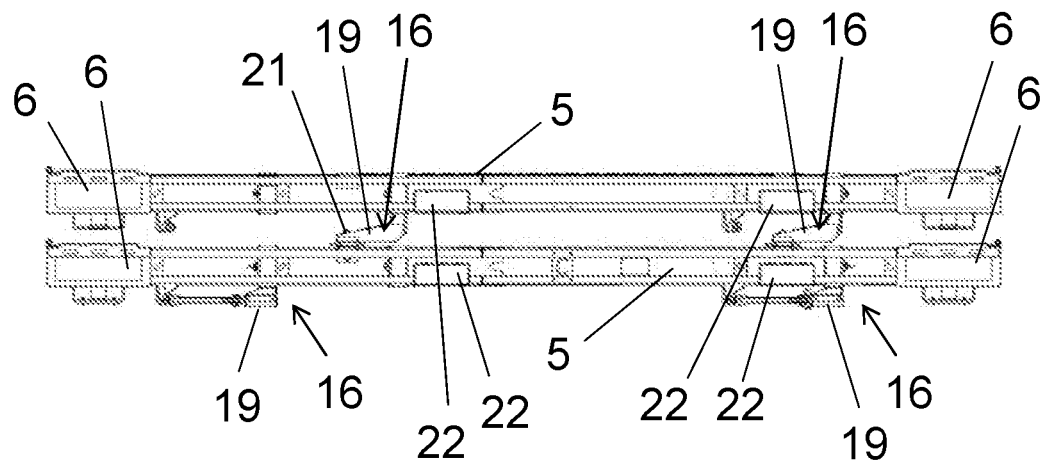
Figure 5F:
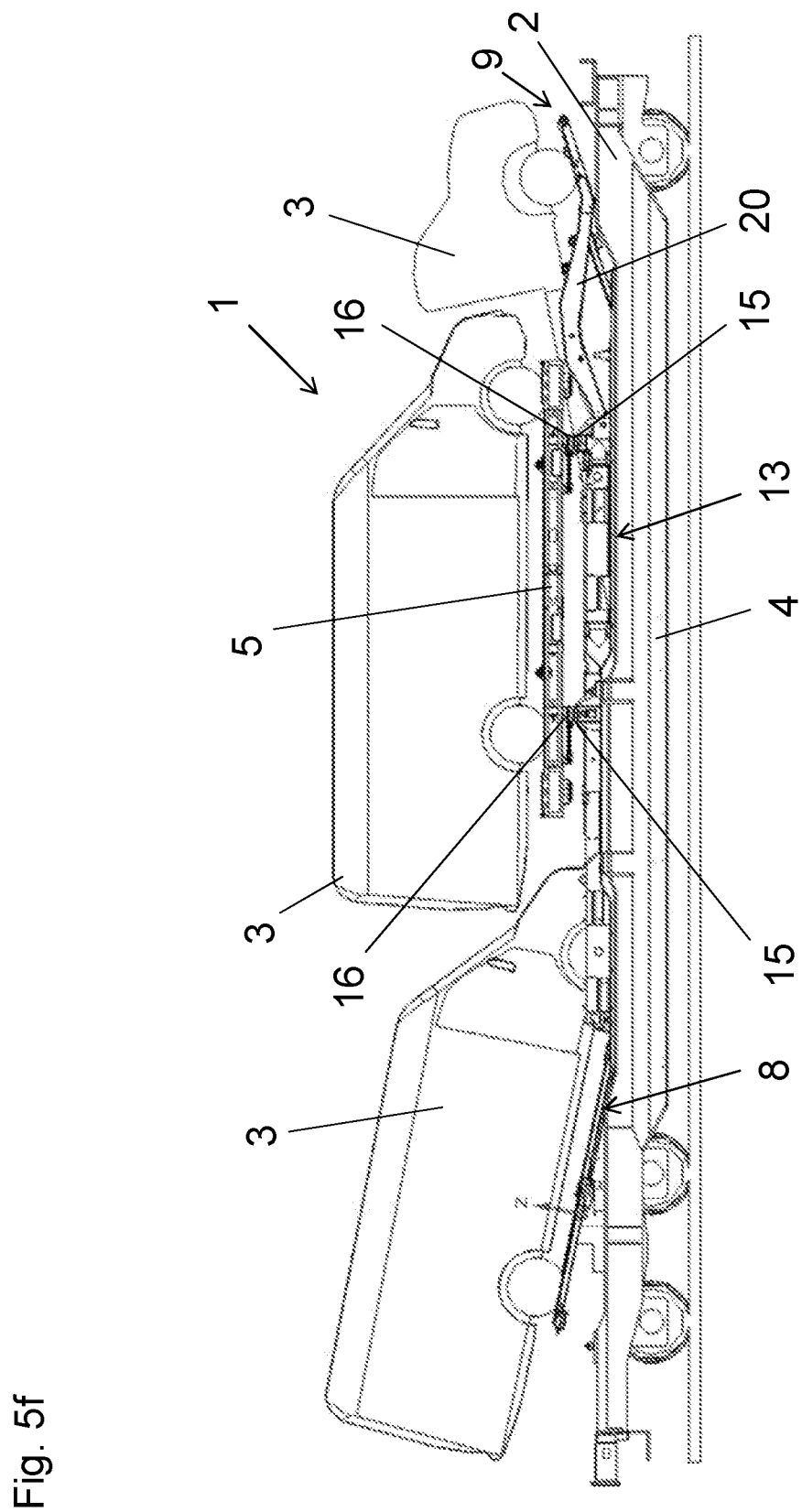
FIG. 5f shows a carrying apparatus of the embodiment of FIG. 2 with vehicles in the loaded state on a pocket wagon using the support means of FIGS. 5a and 5e.

In the second embodiment in FIG. 2 the first support means 4 has two inclinable portions 8, 9 which are moveable between a receiving position for a respective vehicle 3, in which the vehicle 3 is oriented substantially horizontally, and a loading position for the vehicle 3, in which the vehicle 3 is inclined (see for example FIG. 5f). The inclinable portions 8, 9 are mounted pivotably freely—optionally except for an action of a damping device—to a frame or longitudinal bearers 7 of the first support means 4 (see FIG. 5a). In this embodiment the first support means 4 can be basically loaded with more vehicles 3 than the second support means 5. For example the first support means 4 can be loaded with two vehicles 3 and the second support means 5 can be loaded with one vehicle 3.

The second support means 5 extends in respect of its longitudinal extent only over a part of the first support means 4 and is in the form of a plate involving a fixed (here at least substantially horizontal) orientation, which is supported at the first support means 4 by way of coupling locations 15, 16. At least one of the inclinable portions 8, 9 of the first support means 4 can extend in the inclined state under the second support means 5. In the illustrated state of being lifted onto a pocket wagon 2 the inclinable portions 8, 9 of the first support means 4 extend beyond the pocket 13 of the pocket wagon 2. The second support means 5 is disposed in respect of its longitudinal extent within the pocket 13 of the pocket wagon 2. The pivot axes of the inclination of the inclinable portions 8, 9 are disposed here within the pocket 13 of the pocket wagon 2, but alternatively could also be disposed outside and above the pocket 13 (see the inclinable portion 9 in FIGS. 5f and 5g).

In the third embodiment in FIG. 3 the first support means 4 has two inclinable portions 8, 9 which are respectively moveable between a receiving position for a respective vehicle 3, in which the vehicle 3 is oriented substantially horizontally, and a loading position for the vehicle 3, in which the vehicle 3 is inclined. The inclinable portions 8, 9 are mounted pivotably freely—optionally except for an action of a damping device—to a frame or longitudinal bearers 7 of the first support means 4. The second support means 5 has a portion 10 of an inclination which is predetermined prior to loading so that more height is available beneath the portion 10 (see FIG. 6b).

In the illustrated state of being lifted on to a pocket wagon 2 the inclinable portions 8, 9 of the first support means 4 extend beyond the pocket 13 of the pocket wagon 2. The pivot axes of the inclination of the inclinable portions 8, 9 are disposed within the pocket 13 of the pocket wagon 2, but alternatively could also be disposed outside and above the pocket 13 (see the inclinable portion 9 in FIGS. 5f and 5g).

Figure 4:
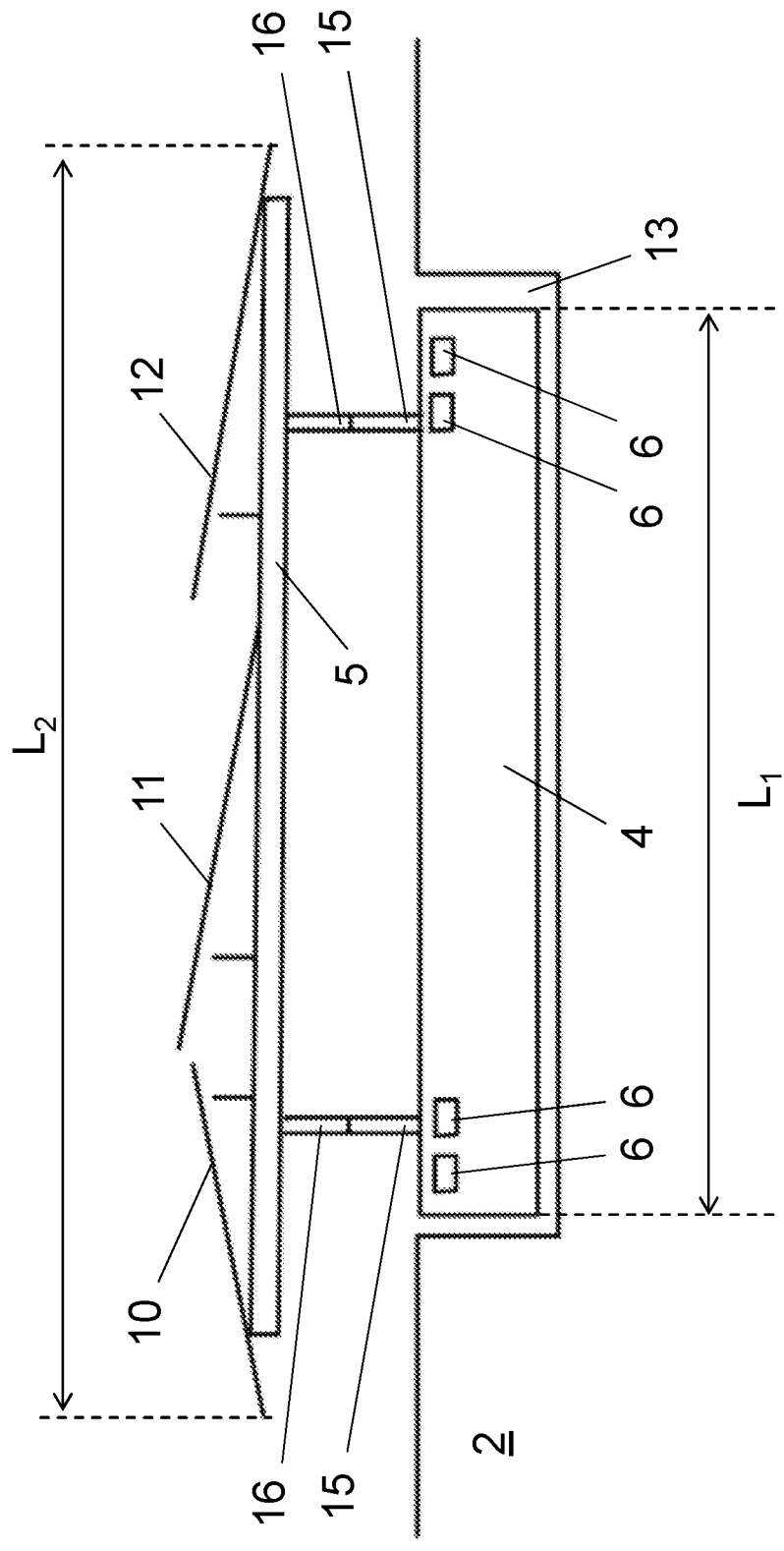

In the fourth embodiment in FIG. 4 the length $L_2$ over which the second support means 5 extends, is greater than the length $L_1$ over which the first support means 4 extends, and the first support means 4 has a region of fixed (here at least substantially horizontal) orientation and the second support means 5 has three portions 10, 11 and 12 of an inclination which can be predetermined prior to loading. In its longitudinal extent the first support means 4 is disposed within the pocket 13 of the pocket wagon 2. In this embodiment the second support means 5 can basically be loaded with more vehicles 3 than the first support means 4. By way of example the first support means 4 can be loaded with two vehicles 3 and the second support means 5 can be loaded with three vehicles 3.

In the illustrated state of being lifted onto a pocket wagon 2 the two outer inclined portions 10, 12 of the second support means 5 extend beyond the pocket 13 of the pocket wagon 2, while the central inclined portion 11 is disposed above the pocket 13 of the pocket wagon 2.

FIGS. 5a-d show second support means 5 of a further embodiment of a carrying apparatus 1 according to the invention.

In the FIG. 5a embodiment the second support means 5 has two longitudinal bearers 7, between which is arranged a driveway 14 for vehicles 3 in the form of a combination (in terms of the longitudinal extent) of bearers and struts. The longitudinal bearers 7 are connected together by way of transverse struts 17. Arranged at both sides of the second support means 5 are two respective coupling locations 16, by way of which the second support means 5 can be releasably connected to a first support means 4 (by way of coupling locations 15). Receiving pockets 6 are provided for a lifting apparatus so that the second support means 5 can be lifted by a lifting apparatus. Further fork pockets 22 are provided for a fork lift truck.

As FIG. 5b shows, it is possible to fit to the second support means 5 which at its underside has contact surfaces (in this embodiment formed by the support legs 19 of the coupling location 16) for standing on a terminal floor, a drive-on ramp 18 in order to make it easier for a vehicle 3 to be driven on and off. It will be appreciated that also applies to all embodiments.

A plurality of second support means 5 for empty transport can be stacked one upon the other by way of the coupling locations 16 (see FIGS. 5c and 5d) and in that state mounted by way of a first support means 4 or directly to a pocket wagon 2.

FIG. 5e shows a first support means 4 of an embodiment of a carrying apparatus 1 according to the invention. In the FIG. 5e embodiment the first support means 4 has two longitudinal bearers 7, between which is arranged a driveway 14 for vehicles 3 in the form of a combination (in terms of the longitudinal extent) of carriers and struts. The longitudinal carriers 7 are connected together by way of transverse struts 17. Arranged at both sides of the first support means 4 are two respective coupling locations 15, by way of which the first support means 4 can be releasably connected to a second support means 5. There are receiving pockets 6 for a lifting apparatus so that the first support means 4 is liftable. The driveway 14 is partially provided on two inclinable portions 8, 9 which are moveable between a receiving position for a respective vehicle 3, in which the vehicle 3 is oriented substantially horizontally and a loading position for the vehicle 3, in which the vehicle 3 is inclined (the receiving position is shown in each case). The inclinable portions 8, 9 are mounted pivotably freely—optionally except for an action of a damping device—. Arranged between the two inclinable portions 8, 9 is a further drivable portion of fixed (here substantially horizontal) orientation.

The one inclinable portion 9 is arranged at the first support means 4 by way of pivotably mounted arms 20. The arms 20 are arranged on pivot bearings outside the drivable width of the driveway 14. In the present embodiment the pivot bearings are partially disposed within a profiled portion of the longitudinal bearers 7 and partially at the outsides of the longitudinal bearers 7.

A length of the arms 20 is so selected that the further portion disposed between the inclinable portions 9, 10, in the illustrated first pivotal position of the arms 20, is prolonged by the inclinable portion 9 in such a way that it can be driven on. The inclinable portion 9 can be prolonged by a prolongation 9 in the direction of the further portion.

It is advantageous in regard to the inclinable portion 8 if as illustrated it is adapted to be variable in length. The variability in length is implemented in the illustrated embodiment by two interleaved, telescopically extendable extension portions 8', 8".

FIG. 5f shows a carrying apparatus 1 of the embodiment of FIG. 2 with vehicles 3 in the loaded state on a pocket wagon 2 using the first and second support means 4, 5 of FIGS. 5a and 5e. It can be seen that the second support means 5 extends in respect of its longitudinal extent only over a part of the first support means 4 and is in the form of a plate of fixed (here at least substantially horizontal) orientation, which is supported by way of the coupling locations 15, 16 at the first support means 4. The inclinable portions 8, 9 of the first support means 4 extend in the illustrated state of being lifted onto a pocket wagon 2 beyond the pocket 13 of the pocket wagon 2. In plan view the second support means 5 is disposed within the pocket 13 of the pocket wagon 2. The pivot axes of the inclination of the inclinable portions 8, 9 are disposed within the pocket 13 of the pocket wagon 2. The vehicles 3 arranged on the first support means 4 project in under the vehicle 3 disposed on the second support means 5.

Figure 5G:
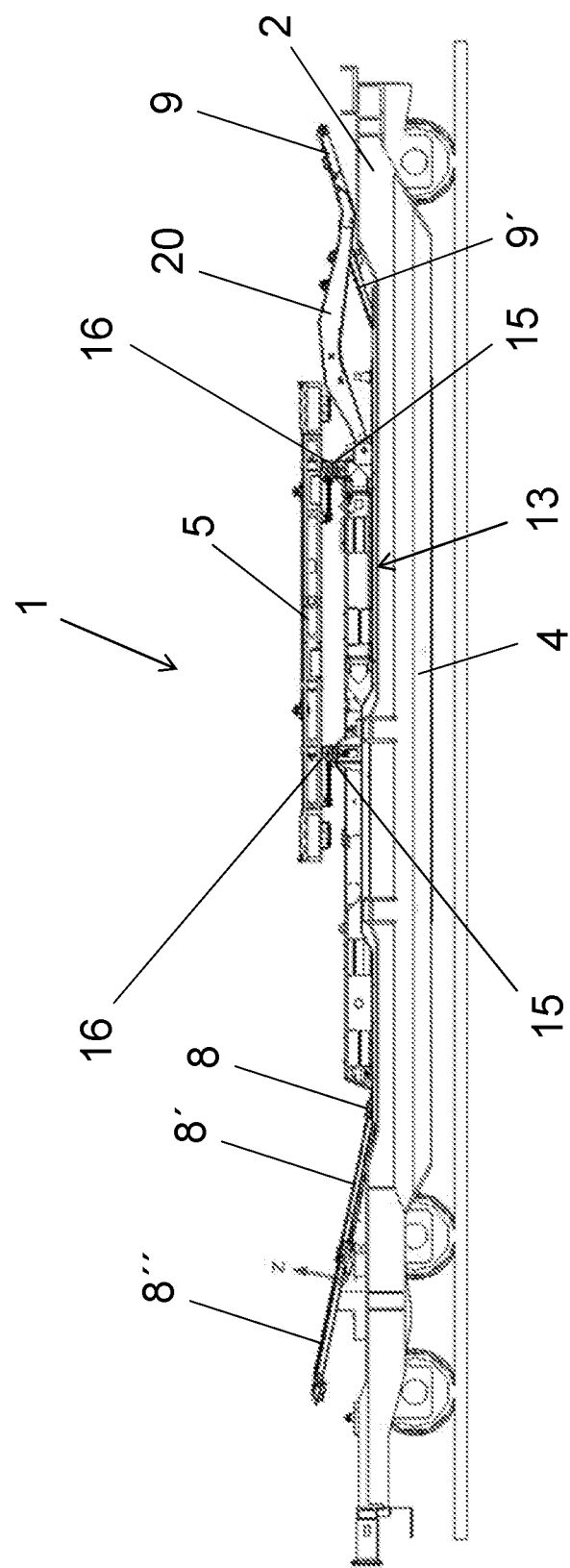
FIG. 5g shows the carrying apparatus of FIG. 5f without vehicles in the loaded state on a pocket wagon.

FIG. 5g shows the carrying apparatus 1 of FIG. 5f without vehicles 3 on a pocket wagon 2.

Figure 5H:
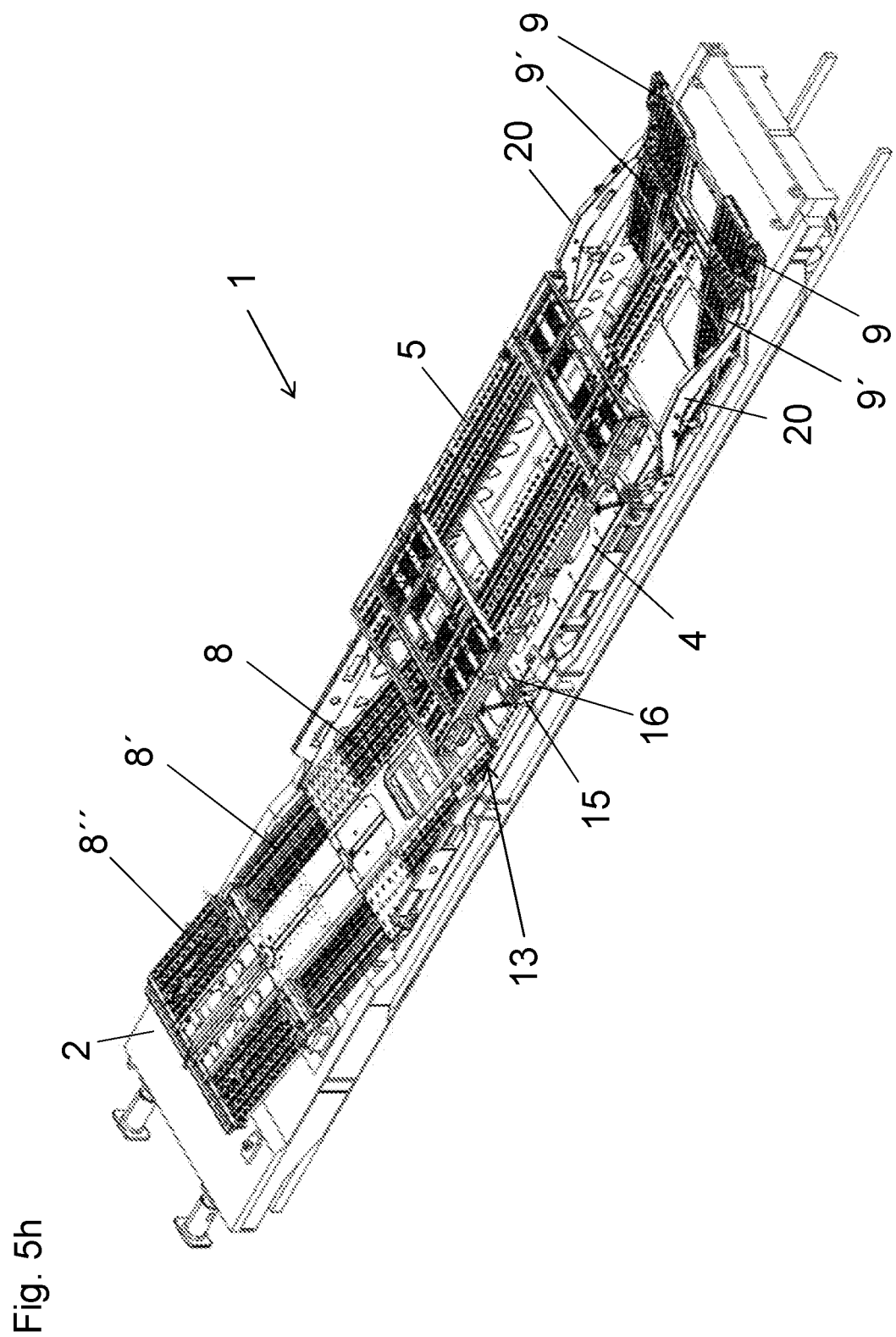
FIG. 5h shows a perspective view of FIG. 5g.

FIG. 5h shows a perspective view in relation to FIG. 5g.

Figure 5I:
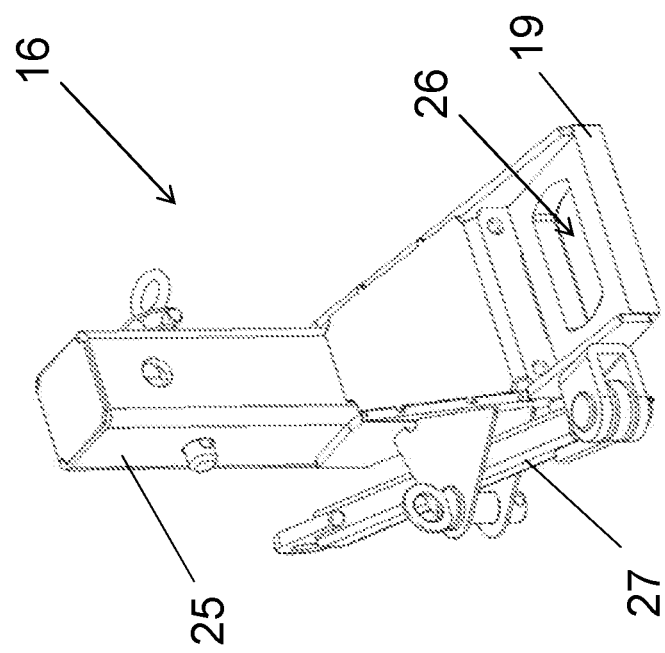
FIG. 5i shows a view of a coupling location of a second support means in isolation.
Figure 5K:
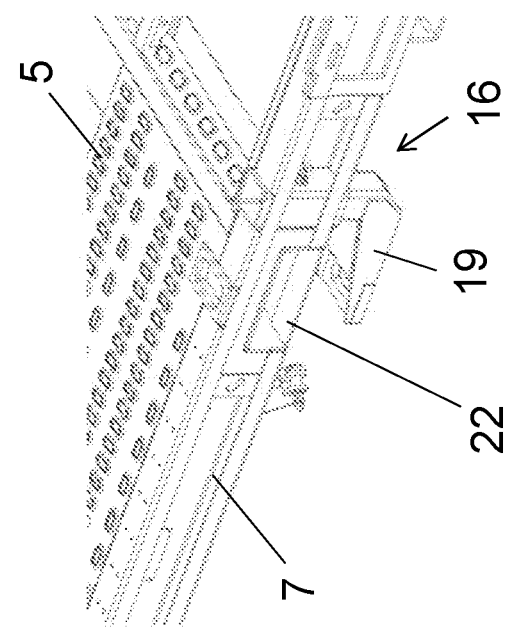
FIG. 5k shows a further detail view of a second support means with the coupling location of FIG. 5i.
Figure 5J:
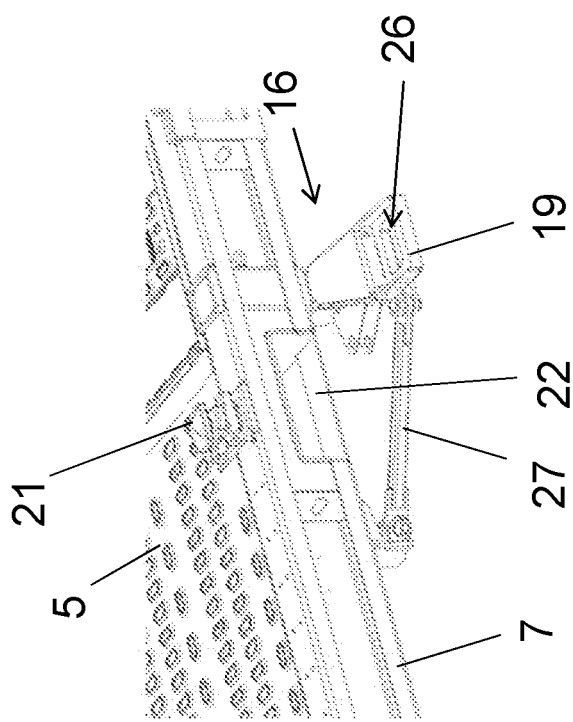
FIG. 5j shows a detail view of a second support means with the coupling location of FIG. 5i.

FIGS. 5i-k show an embodiment of a coupling location 16 of the second support means 5, in which the coupling location 16 has a support foot 19 arranged on a leg 21. The support foot 19 has a receiving opening 26 which can serve to receive a projection of a coupling location 15 of the first support means 4. As shown in FIGS. 5c and 5d the receiving opening 26 can also be used for coupling to a further second support means 5.

The coupling location 16 has a strut arrangement 27 which serves in the braced state (see FIG. 5j) in travel operation of the pocket wagon 2 to transmit dynamic forces to the second support means 5. In that way for example torsional forces acting on the leg 25 can be reduced.

As can be seen from a comparison between FIGS. 5j and 5k the leg 25 and thus the support foot 19 can be arranged in different orientations on the second support means 5 (for example by insertion in the desired orientation into a receiving means). In the orientation shown in FIG. 5j the coupling location 16 serves for connecting the second support means 5 to a coupling location 15 of the first support means 4. In the orientation shown in FIG. 5k the coupling location 16 is suitable for connecting the second support means 5 to a further second support means 5, for example by way of a twist lock connection 21 as shown in FIG. 5j (see also FIG. 5d).

Figure 6A:
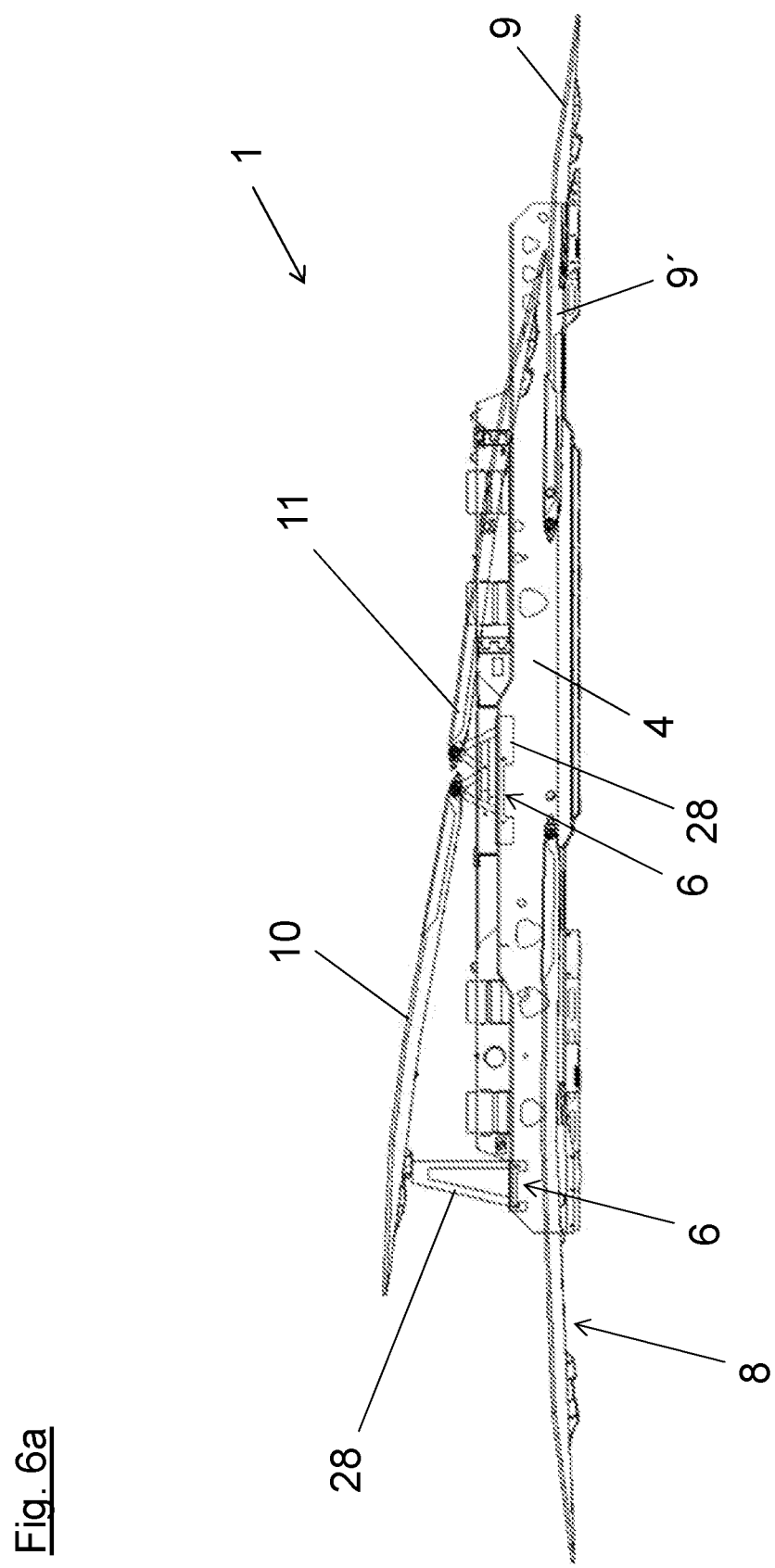
FIG. 6a shows a further embodiment of a carrying apparatus according to the invention.

FIG. 6a shows a second support means 5 of an embodiment of a carrying apparatus 1 according to the invention. Unlike the second support means 5 in FIG. 5a the second support means 5 has two portions 10, 11 of an inclination which can be selected prior to loading and which is fixed in the loaded state. The inclination of the portion 10 is predetermined for example by selecting the height of the supporting arrangements 28 which are arranged at the second support means 5 (in FIG. 6a the one supporting arrangement 28 is concealed by the visible supporting arrangement 28). Otherwise the second support means 5 can be of such a configuration, as shown in FIGS. 5a-5d. In the state shown in FIG. 6a the portion 11 in conjunction with the portion 9 of the first support means 4 can serve as a drive-on ramp for a vehicle 3 to reach the portion 10. After that the portion 11 can be removed. The portion 11 can be used again for unloading.

Figure 6B:
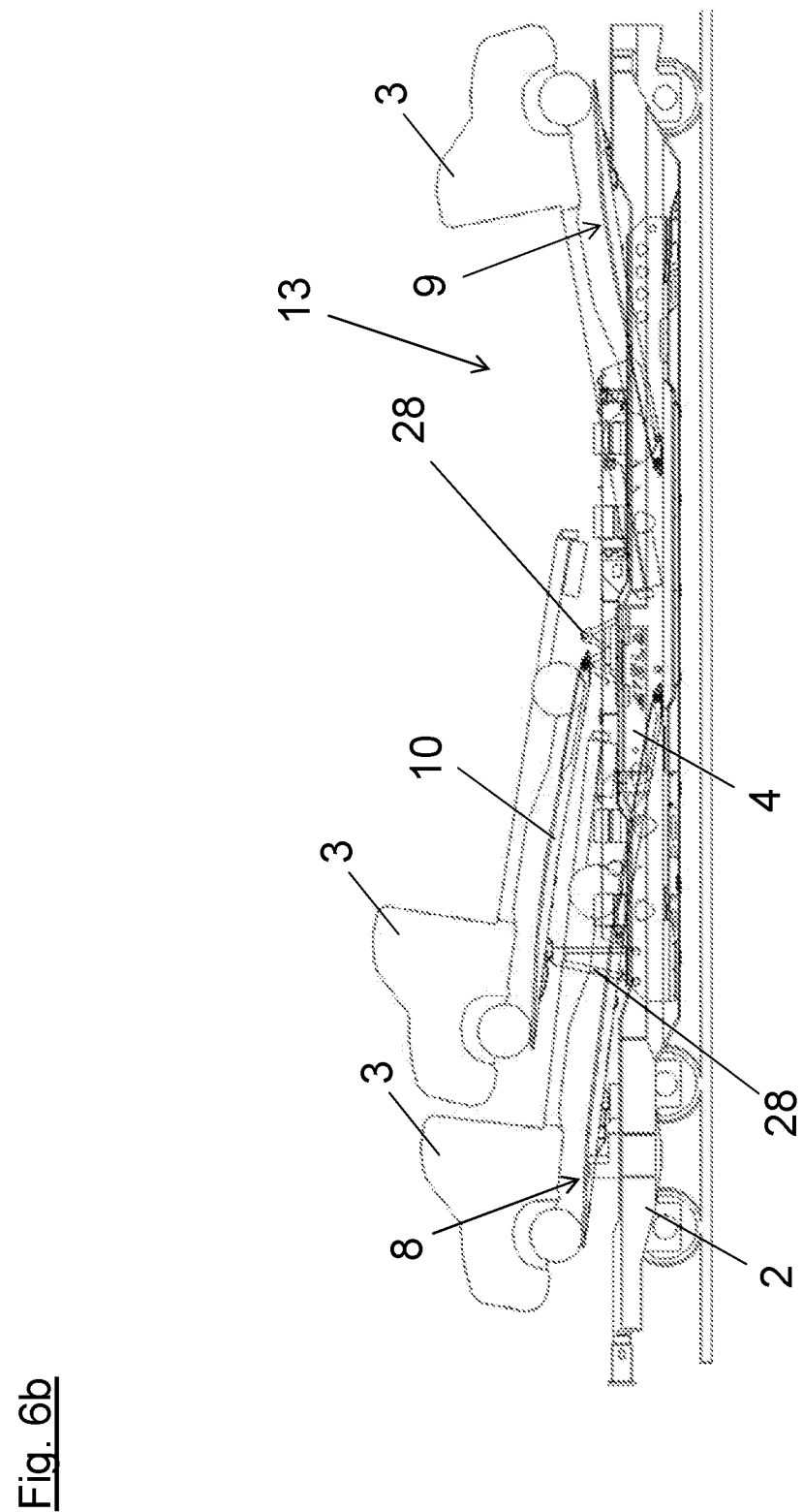
FIG. 6b shows a carrying apparatus with vehicles in the loaded state on a pocket wagon using the support means of FIGS. 5e and 6a, FIGS. 7a-c show a first embodiment of a method of loading a pocket wagon, FIGS. 8a,b show a second embodiment of a method of loading a pocket wagon.

FIG. 6b shows a carrying apparatus 1 with vehicles 3 in the loaded state on a pocket wagon 2 using the first and second support means 4, 5 shown in FIGS. 5e and 6a, wherein the portion 11 of the second support means 5 has been removed.

Figure 7A:
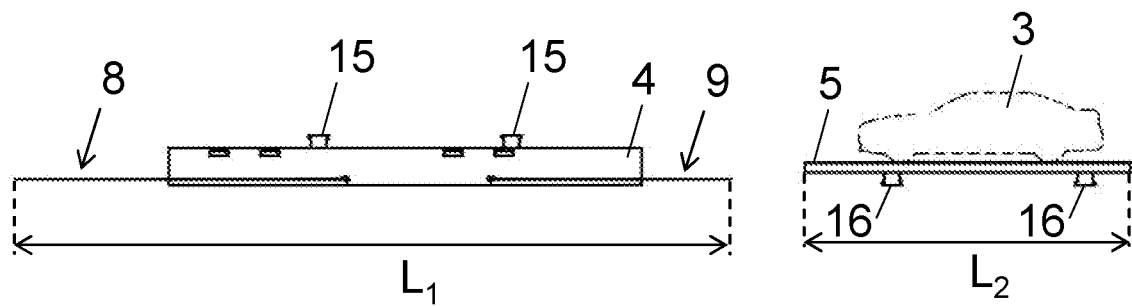
Figure 7B:
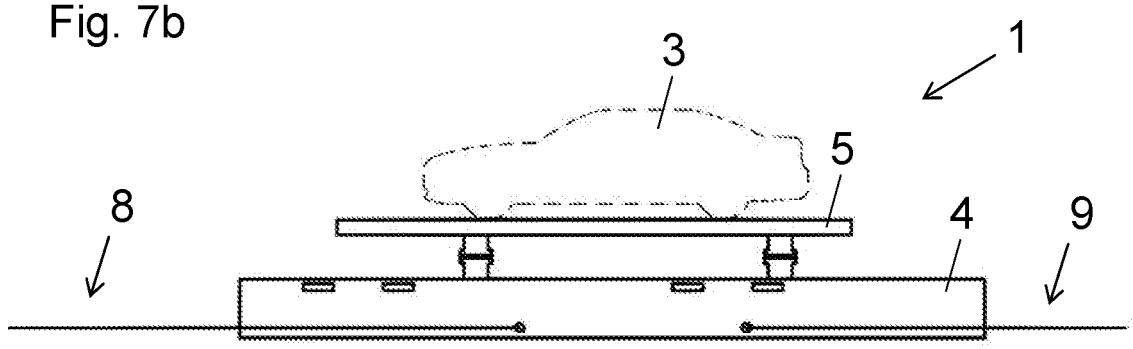
Figure 7C:
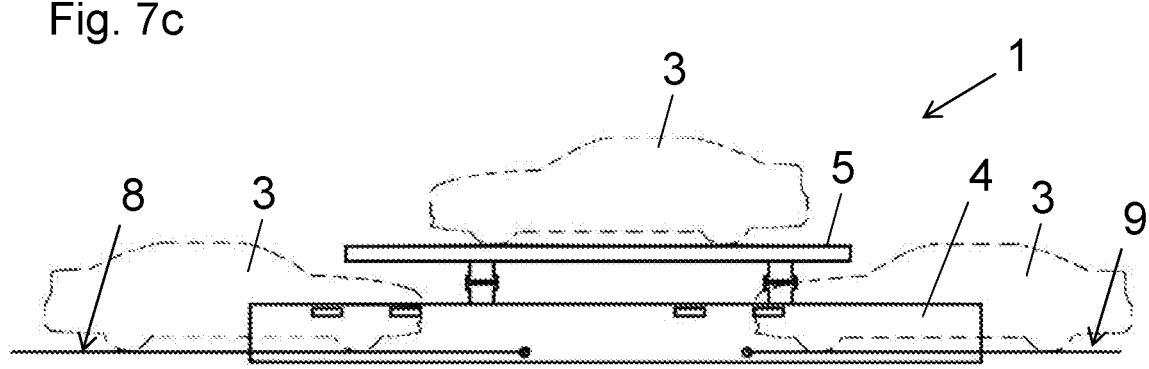

The sequence in FIGS. 7a-c shows a first embodiment of a method of loading a pocket wagon 2 using first and second support means 4, 5, from which a carrying apparatus 1 according to the invention is formed.

In the illustrated configuration the length $L_1$, over which the first support means 4 extends (the inclinable support portions 8, 9 of the first support means 4 are disposed in the receiving position) is greater than the length $L_2$, over which the second support means 5 extends. The illustrated embodiment makes use by way of example of an embodiment of a carrying apparatus 1 as shown in FIG. 2.

In FIG. 7a a vehicle 3 has already been driven onto the second support means 5. In that state the second support means 5 is now lifted by means of the receiving locations by a lifting apparatus (not shown) onto the still unloaded first support means 4, thus giving the state shown in FIG. 7b, in which the first and second support means 4, 5 jointly form a carrying apparatus 1 according to the invention.

FIG. 7c shows the state which occurs when two vehicles 3 have been driven onto the first support means 4. The loaded carrying apparatus 1 can now be lifted by means of the receiving locations of the first support means 4, by a lifting apparatus (not shown), onto a pocket wagon 2 (also not shown).

Figure 8A:
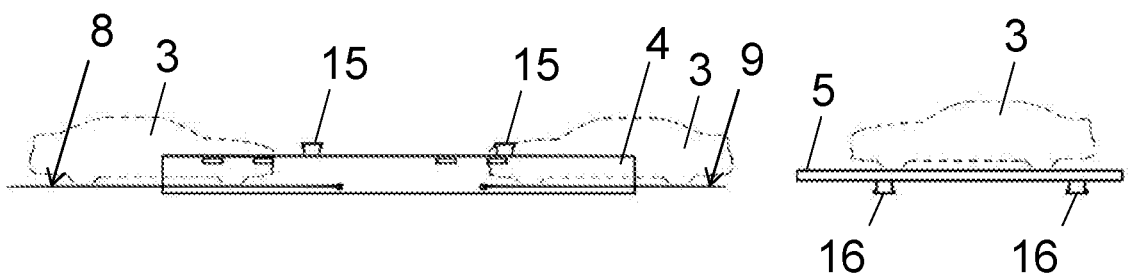

The sequence in FIGS. 8a, b shows an alternative second embodiment of a method of loading a pocket wagon 2 using a carrying apparatus 1 according to the invention. The sole difference in relation to the method shown in FIG. 7 is that here the first support means 4 and the second support means 5 are loaded with vehicles 3 independently of each other in a state of being placed on the terminal floor. FIG. 8a shows the state which occurs when two vehicles 3 have been driven onto the first support means 4 and a vehicle 3 has been driven onto the second support means 5.

Figure 8B:
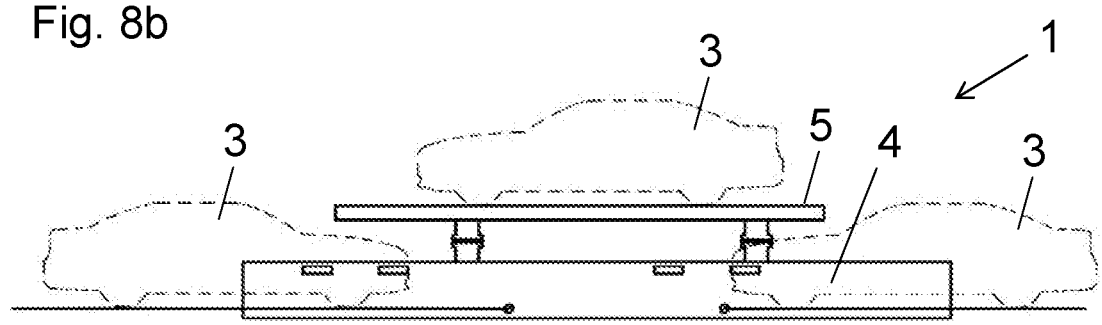

In that state the second support means 5 is now lifted by means of the receiving locations by a lifting apparatus (not shown) onto the first support means 4 which is already loaded, thus giving the state shown in FIG. 8b in which the first and second support means 4, 5 jointly form a carrying apparatus 1 according to the invention and the loaded carrying apparatus 1 can be lifted by means of the receiving locations of the first support means 4 by a lifting apparatus (not shown) onto a pocket wagon 2 (not shown).

LIST OF REFERENCES 1 liftable carrying apparatus
2 pocket wagon 3 vehicle
4 first support means
5 second support means
5 receiving pocket for lifting apparatus (for example crane)
6 longitudinal bearer
7 inclinable portion of the first support means
8' extension of an inclinable portion of the first support means
8" extension of an inclinable portion of the first support means
9 inclinable portion of a support means of the first support means
9' prolongation of an inclinable portion of the first support means
10 inclinable portion of the second support means
11 inclinable portion of the second support means
12 inclinable portion of the second support means
13 pocket of the pocket wagon
14 driveway
15 coupling location of the first support means
16 coupling location of the second support means
17 transverse strut
18 drive-on ramp
19 support feet of the coupling location of the second support means
20 arms of the first support means
21 twist lock connection
22 fork pockets
23 portion of the first support means
24 ISO studs of the pocket wagon
25 leg of the coupling location of the second support means
26 receiving opening in the leg of the coupling location of the second support means
27 strut arrangement
28 supporting arrangement for portion with predefinable inclination
$L_1$ length of the first support means
$L_2$ length of the second support means

The invention claimed is:

1. A pocket wagon with a liftable carrying apparatus for loading the pocket wagon with vehicles by a lifting apparatus, comprising:
a first support means for at least one vehicle, the first support means extending over a first length;
at least one second support means for at least one vehicle, the at least one second support means being arranged above the first support means and extending over a second length; and
receiving locations, for a lifting apparatus, that are arranged at the first and the at least one second support means,
wherein the first length over which the first support means extends and the second length over which the at least one second support means extends differ from each other, wherein the first and the at least one second support means are or can be releasably connected together for joint lifting by a lifting apparatus, wherein the first support means projects at least partially into a pocket of the pocket wagon,
and wherein either:
the second length is greater than the first length, and the second length of the at least one second support means is selected so that the at least one second support means, in a state of being lifted onto the pocket wagon, projects beyond the pocket of the pocket wagon and the first support means is disposed such that the first length extends within the pocket of the pocket wagon; or
the first length is greater than the second length, the first support means has two inclinable portions which are moveable between a receiving position for a respective vehicle, in which the vehicle is oriented substantially horizontally or inclinedly, and a loading position for the vehicle, in which the vehicle is inclined, and at least one of the inclinable portions of the first support means can extend in an inclined state under the at least one second support means, and the inclinable portions of the first support means, in a state of being lifted on to the pocket wagon, extend beyond the pocket of the pocket wagon.

2. The pocket wagon with the carrying apparatus as set forth in claim 1, wherein the first support means is arranged between two longitudinal bearers or in a carrying frame and/or the at least one second support means is arranged between two longitudinal bearers or in a carrying frame.

3. The pocket wagon with the carrying apparatus as set forth in claim 1, wherein the first and the at least one second support means each have contact surfaces for direct placement on a terminal floor, and the first and the at least one second support means can be driven onto independently of each other in a state of placement on the terminal floor.

4. The pocket wagon with the carrying apparatus as set forth in claim 1, wherein the at least one second support means in a state of being connected to the first support means is carried by the first support means.

5. The pocket wagon with the carrying apparatus as set forth in claim 4, further comprising coupling locations by way of which the at least one second support means is or can be releasably connected to the first support means.

6. The pocket wagon with the carrying apparatus as set forth in claim 5, wherein the coupling locations are or can be connected by a twist lock.

7. The pocket wagon with the carrying apparatus as set forth in claim 1, wherein at least one portion of the first and/or the at least one second support means is moveable between a receiving position for a vehicle, in which the vehicle is oriented substantially horizontally or inclinedly, and a loading position for the vehicle, in which the vehicle is inclined.

8. The pocket wagon with the carrying apparatus as set forth in claim 7, wherein the at least one moveable portion is mounted pivotably freely to a carrying frame or longitudinal bearers of the first and the at least one second support means, respectively.

9. The pocket wagon with the carrying apparatus as set forth in claim 7, wherein the first support means has two moveable portions.

10. The pocket wagon with the carrying apparatus as set forth in claim 9, wherein at least one portion of the at least one second support means is moveable between the receiving position and the loading position, and wherein the at least one moveable portion of the at least one second support means, in a state of the at least one second support means being connected to the first support means, is supported in the loading position at the first support means or at the pocket wagon.

11. The pocket wagon with the carrying apparatus as set forth in claim 7, wherein the at least one moveable portion is mounted pivotably freely, except for an action of a damping device, to a carrying frame or longitudinal bearers of the first and the at least one second support means, respectively.

12. The pocket wagon with the carrying apparatus as set forth in claim 1, wherein at least one portion of the first and/or the at least one second support means is provided with a horizontal or inclined orientation.

13. The pocket wagon with the carrying apparatus as set forth in claim 12, wherein the at least one second support means has at least one portion with a predetermined inclination.

14. The pocket wagon with the carrying apparatus as set forth in claim 12, wherein an inclination of the at least one portion can be predetermined prior to a loading operation.

15. The pocket wagon with the carrying apparatus as set forth in claim 1, wherein the receiving locations comprise receiving pockets.

16. A method of loading a pocket wagon with at least three vehicles using the pocket wagon with the carrying apparatus as set forth in claim 1, wherein at least one of the at least three vehicles is arranged on the pocket wagon at a greater height than at least one other of the at least three vehicles, the method comprising:
    providing the first and the at least one second support means on a terminal floor, wherein the first and the at least one second support means stand independently of each other on the terminal floor;
    loading the at least one second support means with the vehicles to be loaded;
    placing the loaded at least one second support means on the first support means prior to lifting on to the pocket wagon to form the carrying apparatus such that the carrying apparatus is liftable as a unit; and
    lifting the carrying apparatus as a unit by means of a lifting apparatus on to the pocket wagon in such a way that the at least one second support means is arranged above the first support means and the first support means projects at least partially into the pocket of the pocket wagon.

17. The method as set forth in claim 16, wherein the loading of the at least one second support means comprises loading the at least one second support means and the first support means with the vehicles to be loaded by driving the vehicles on to the first and the at least one second support means.

18. A method of unloading a pocket wagon loaded with at least three vehicles using the pocket wagon with the carrying apparatus as set forth in claim 1, wherein at least one of the at least three vehicles is arranged on the first support means of the carrying apparatus and at least one of the at least three vehicles is arranged on the at least one second support means of the carrying apparatus, wherein the at least one second support means is placed on the first support means and the first support means is arranged in the pocket of the pocket wagon, the method comprising:
    lifting away the carrying apparatus as a unit by means of a lifting apparatus from the pocket wagon and setting it down on a terminal floor;
    lifting off the at least one second support means from the first support means and setting down the at least one second support means on a terminal floor; and
    unloading the at least one second support means.

19. The method as set forth in claim 18, wherein the unloading of the at least one second support means comprises unloading the first support means and the at least one second support means by driving the vehicles off of the first and the at least one second support means.

* * * * *